United States Patent
Luo et al.

(10) Patent No.: US 9,849,528 B2
(45) Date of Patent: Dec. 26, 2017

(54) ELECTRICAL DISCHARGE MACHINING SYSTEM HAVING INDEPENDENT ELECTRODES

(71) Applicant: General Electric Company, Schenectady, NY (US)

(72) Inventors: Yuefeng Luo, Mechanicville, NY (US); Shamgar Elijah McDowell, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 240 days.

(21) Appl. No.: 14/854,476

(22) Filed: Sep. 15, 2015

(65) Prior Publication Data

US 2017/0072487 A1    Mar. 16, 2017

(51) Int. Cl.
*B23H 1/02* (2006.01)
*B23H 1/04* (2006.01)
*B23H 9/10* (2006.01)

(52) U.S. Cl.
CPC ............. *B23H 1/028* (2013.01); *B23H 1/04* (2013.01); *B23H 9/10* (2013.01)

(58) Field of Classification Search
CPC . B23H 1/028; B23H 7/18; B23H 9/10; B23H 1/04; B23H 7/26; B23H 7/30
See application file for complete search history.

(56) References Cited

U.S. PATENT DOCUMENTS 679,105 A    7/1901   Buck
3,590,204 A * 6/1971  O'Connor ............. B23H 7/265
                                              219/69.14
(Continued)

FOREIGN PATENT DOCUMENTS

EP     2 881 204 A1    6/2015
GB     2222108 A  *    2/1990
(Continued)

OTHER PUBLICATIONS

Machine translation of Japan Patent document No. 60-108,213, Jul. 2017.*

(Continued)

*Primary Examiner* — Geoffrey S Evans
(74) *Attorney, Agent, or Firm* — Ernest G. Cusick; Hoffman Warnick LLC

(57) ABSTRACT

An electrical discharge machining (EDM) system according to embodiments includes: a guide structure; a plurality of electrode devices positioned at least partially within the guide structure, the plurality of electrode devices aligned to provide a plurality of electrical discharges to a workpiece, each of the plurality of electrode devices including: an electrode for positioning proximate the workpiece; an electrode holder coupled to the electrode for holding the electrode proximate the workpiece; and a driver coupled to the electrode holder, the driver adapted to modify a position of the electrode holder and the electrode; and a control system operably connected with the driver, the control system configured to provide instructions to the driver of at least one of the plurality of electrode devices to modify a position of the at least one of the plurality of electrodes independently of at least one other one of the plurality of electrodes.

17 Claims, 5 Drawing Sheets

(56) References Cited

U.S. PATENT DOCUMENTS

| | | | | |
|---|---|---|---|---|
| 3,740,519 | A | * | 6/1973 | O'Connor ................ B23H 1/04 219/69.15 |
| 4,146,770 | A | * | 3/1979 | Dinsdale ................. B23H 1/02 219/69.13 |
| 4,159,407 | A | | 6/1979 | Wilkinson et al. |
| 4,188,522 | A | * | 2/1980 | Baker ..................... B23H 7/26 219/69.15 |
| 4,476,369 | A | | 10/1984 | Inoue |
| 4,670,635 | A | * | 6/1987 | Johnson .................. B23H 7/26 219/69.15 |
| 4,767,903 | A | * | 8/1988 | Sciaroni .................. B23H 9/14 219/69.16 |
| 4,814,573 | A | * | 3/1989 | Check .................... B23H 7/265 219/69.15 |
| 4,819,325 | A | | 4/1989 | Cross et al. |
| 4,992,639 | A | | 2/1991 | Watkins et al. |
| 5,177,336 | A | * | 1/1993 | Duffin ................... B23H 7/265 219/69.15 |
| 5,605,639 | A | | 2/1997 | Banks et al. |
| 5,618,450 | A | * | 4/1997 | Stuart ..................... B23H 1/04 219/69.15 |
| 5,983,984 | A | | 11/1999 | Auderheide et al. |
| 6,165,422 | A | * | 12/2000 | Baker ..................... H01T 19/00 422/186.04 |
| 6,373,018 | B1 | * | 4/2002 | Wei ......................... B23H 7/26 219/69.11 |
| 6,403,910 | B1 | | 6/2002 | Stang et al. |
| 8,168,913 | B2 | | 5/2012 | Luo |
| 2004/0050821 | A1 | | 3/2004 | Krenz |
| 2007/0264566 | A1 | * | 11/2007 | Arndt ...................... B23H 1/04 429/208 |
| 2011/0186551 | A1 | * | 8/2011 | Itoh ........................ B23H 1/02 219/69.13 |
| 2014/0131318 | A1 | | 5/2014 | Luo et al. |

FOREIGN PATENT DOCUMENTS

| | | | |
|---|---|---|---|
| JP | 60-108213 | A * | 6/1985 |
| JP | 11-170119 | A * | 6/1999 |
| JP | 2000-354914 | A * | 12/2000 |

OTHER PUBLICATIONS

Machine translation of Japan Patent document No, 11-170,119, Jul. 2017.*

Machine translation of Japan Patent document No. 2000-354,914, Jul. 2017.*

U.S. Appl. No. 14/854,484, filed Sep. 15, 2015, Luo et al.

Extended European Search Report and Opinion issued in connection with corresponding EP Application No. 16183855.2 dated Jan. 19, 2017.

Extended European Search Report and Opinion issued in connection with related EP Application No. 16188463.0 dated Jan. 19, 2017.

* cited by examiner

ELECTRICAL DISCHARGE MACHINING SYSTEM HAVING INDEPENDENT ELECTRODES

CROSS-REFERENCE TO RELATED APPLICATION

This application is related to co-pending patent application Ser. No. 14/854,484, filed concurrently herewith, on Sep. 15, 2015.

BACKGROUND OF THE INVENTION

The subject matter disclosed herein relates to electrical discharge machining. Specifically, the subject matter disclosed herein relates to systems for performing electrical discharge machining in turbine components, e.g., gas turbine blades or buckets.

Electrical discharge machining (EDM) is a manufacturing process whereby shapes are formed in a subject material using electrical discharge (sparks). An electrode (also called a tool electrode) is placed proximate the subject material (also called a workpiece), and an electrical voltage is applied between the electrode and workpiece. When the intensity of the electric field between the electrode and the subject material exceeds the resistance of the dielectric medium, a current flows from the electrode to the subject material, or vice versa, removing some material from both the electrode and subject material.

Currently, EDM is the most reliable technology used to form cooling holes and fuel injection holes in turbine components (e.g., airfoils). As such, EDM is widely used to form these holes in turbine airfoils. However, EDM drilling is relatively slow, even when using a set of multiple electrodes. Further, several EDM machines are typically employed at one time in order to meet production time requirements, which occupies a significant amount of floor space in a manufacturing facility. Even further, in EDM machines employing grouped electrode arrangements, local debris drives the slowdown and withdrawal of not only one or more affected electrodes but also the entire group of electrodes including the unaffected electrodes. The entire group of electrodes feeds or withdraws together according to the worst case electrode (such as the electrode with the most debris buildup or shortest workpiece-electrode gap). As a result, the overall feed rate or machining productivity follows the lowest feed rate of the worst electrode with the most debris buildup or shortest gap at any given time.

BRIEF DESCRIPTION OF THE INVENTION

Various embodiments of the disclosure include an electrical discharge machining (EDM) system. In some cases, the EDM system includes: a guide structure; a plurality of electrode devices positioned at least partially within the guide structure, the plurality of electrode devices aligned to provide a plurality of electrical discharges to a workpiece, each of the plurality of electrode devices including: an electrode for positioning proximate the workpiece; an electrode holder coupled to the electrode for holding the electrode proximate the workpiece; and a driver coupled to the electrode holder, the driver adapted to modify a position of the electrode holder and the electrode; and a control system operably connected with the driver, the control system configured to provide instructions to the driver of at least one of the plurality of electrode devices to modify a position of the at least one of the plurality of electrodes independently of at least one other one of the plurality of electrodes.

A first aspect of the disclosure includes and EDM system having: a guide structure; a plurality of electrode devices positioned at least partially within the guide structure, the plurality of electrode devices aligned to provide a plurality of electrical discharges to a workpiece, each of the plurality of electrode devices including: an electrode for positioning proximate the workpiece; an electrode holder coupled to the electrode for holding the electrode proximate the workpiece; and a driver coupled to the electrode holder, the driver adapted to modify a position of the electrode holder and the electrode; and a control system operably connected with the driver, the control system configured to provide instructions to the driver of at least one of the plurality of electrode devices to modify a position of the at least one of the plurality of electrodes independently of at least one other one of the plurality of electrodes.

A second aspect of the disclosure includes: an EDM system having: a guide structure; a plurality of electrode devices positioned at least partially within the guide structure, the plurality of electrode devices aligned to provide a plurality of electrical discharges to a workpiece, each of the plurality of electrode devices including: an electrode for positioning proximate the workpiece; an electrode holder coupled to the electrode for holding the electrode proximate the workpiece; and a driver coupled to the electrode holder, the driver adapted to modify a position of the electrode holder and the electrode; at least one sensor for detecting a position of an electrode relative to a the workpiece; and a control system operably connected with the driver, the control system configured to provide instructions to the driver of at least one of the plurality of electrode devices to modify a position of the at least one of the plurality of electrodes independently of at least one other one of the plurality of electrodes based upon the detected position of the electrode.

A third aspect of the disclosure includes an EDM system having: a guide structure; a machine ram coupled to the guide structure; a plurality of electrode devices positioned at least partially within the guide structure, the plurality of electrode devices aligned to provide a plurality of electrical discharges to a workpiece, each of the plurality of electrode devices including: an electrode for positioning proximate the workpiece; an electrode holder coupled to the electrode for holding the electrode proximate the workpiece; and a driver coupled to the electrode holder, the driver adapted to modify a position of the electrode holder and the electrode; at least one sensor for detecting a position of an electrode relative to the workpiece; a control system operably connected with the driver, the control system configured to provide instructions to the driver of at least one of the plurality of electrode devices to modify a position of the at least one of the plurality of electrodes independently of at least one other one of the plurality of electrodes based upon the detected position of the electrode; and a set of independent power supplies connected with each of the plurality of electrode structures such that a loss of power to one of the plurality of electrode structures does not cause a loss of power to a remainder of the plurality of electrode structures.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

Figure 1:
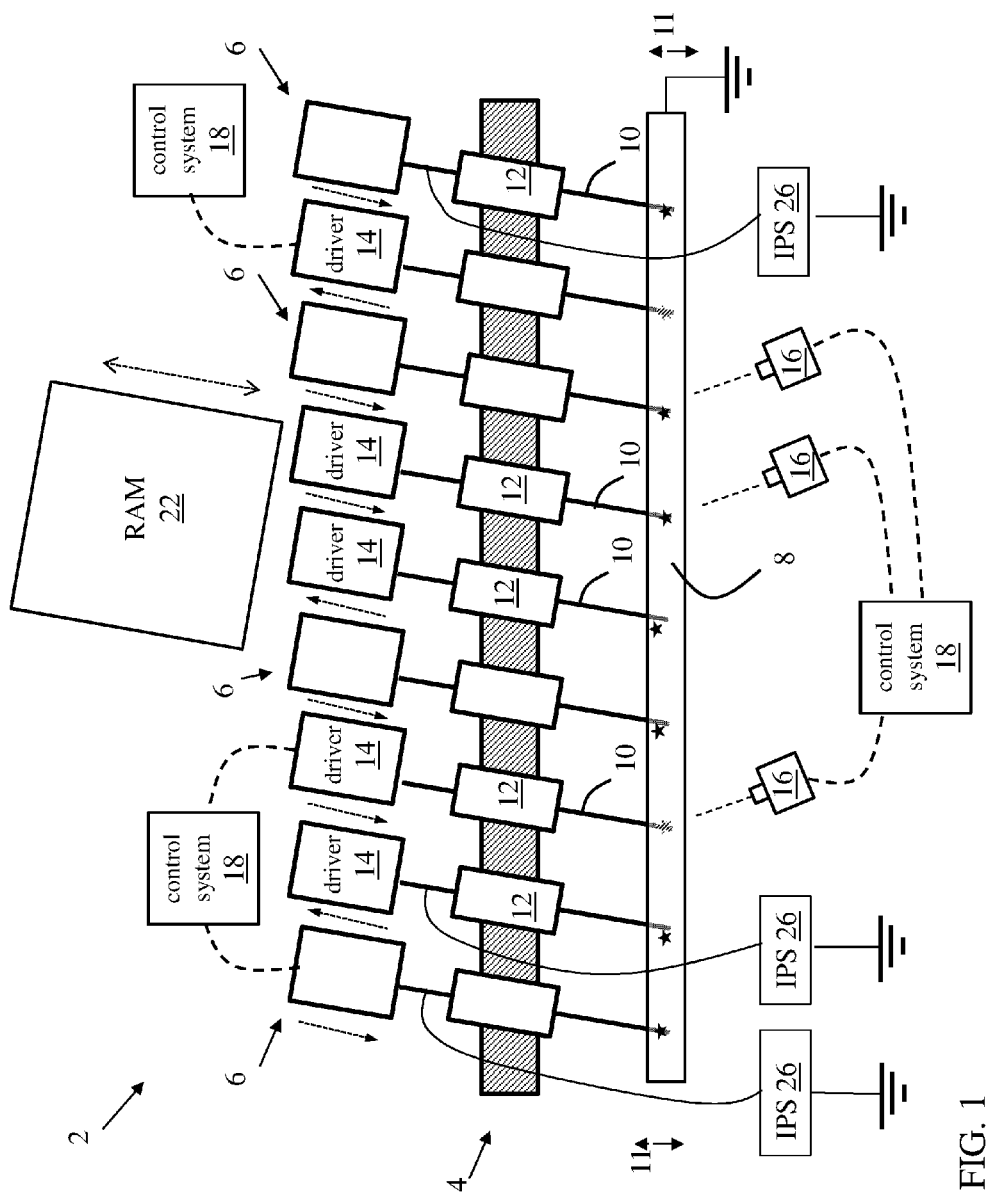
FIG. 1 shows a schematic depiction of a portion of an electrical discharge machining (EDM) system according to various embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted herein, the subject matter disclosed relates to electrical discharge machining. Specifically, the subject matter disclosed herein relates to systems for performing electrical discharge machining in turbine components, e.g., gas turbine blades or buckets.

In contrast to conventional approaches, various embodiments of the disclosure include an electrical discharge machining (EDM) system having a set of independent electrodes. That is, the EDM system includes a plurality of independently powered, and thus independently controlled, electrodes. These independent electrodes can be insulated from one another, and coupled with at least two distinct controllers (e.g., several distinct controllers). The system can further include independent (electrically isolated) processors to detect different gaps between the electrodes, and opto-couplers to connect the independent processors to a central processor while keeping noise low. The system can include a mounting frame, back plate and guiding plate to stabilize the electrodes. Various features of the disclosure can increase the speed of EDM on turbine components (e.g., airfoils) by several times (e.g., up to ten times).

As denoted in these Figures, the "A" axis represents axial orientation (along the axis of the turbine rotor, omitted for clarity). As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location. It is further understood that common numbering between FIGURES can denote substantially identical components in the FIGURES.

Turning to FIG. 1, a schematic depiction of a portion of an electrical discharge machining (EDM) system 2 is shown according to various embodiments. As shown, EDM system 2 can include a guide structure 4, and a plurality of electrode devices 6 positioned at least partially within guide structure 4 (e.g., guide structure 4 at least partially envelops electrode devices 6). According to various embodiments, electrode devices 6 are aligned to provide an electrical discharge to a workpiece 8 (e.g., a turbine component such as a gas turbine airfoil).

Each of the plurality of electrode devices 6 can include an electrode 10 for positioning proximate (e.g., contacting or nominally separated from) workpiece 8, and an electrode holder 12 coupled to electrode 10 for holding the electrode 10 proximate workpiece 8. Each electrode device 6 can further include a driver 14 coupled to electrode holder 12. Driver 14 can be adapted to modify a position of electrode 10 (relative to workpiece 8), held inside holder 12, with linear bearings. In various embodiments, driver 14 can include at least one of an electric or pneumatic driver, and in some cases, can include a voice coil or a hydraulic driver.

EDM system 2 can further include at least one sensor 16 for detecting a position of an electrode 10 relative to the guide structure 4 in the plurality of electrode devices 6. In various embodiments, the at least one sensor 16 can include a plurality of sensors 16, and in some cases, at least one of sensor(s) 16 is configured to detect a position of multiple electrodes 10, as well as a workpiece-electrode gap 11 (distance between each electrode 10 and workpiece 8). The at least one sensor 16 can include, e.g., an optical sensor, laser-based sensor, or other conventional sensor capable of detecting the position of one or more electrodes 10. In various embodiments, sensor(s) 16 can include a gap senor configured to detect the voltage signal between an electrode 10 and workpiece 8.

EDM system 2 can further include a control system (CS) 18 operably connected with driver 14 (e.g., via conventional wireless and/or hard-wired means), where control system 18 is configured to provide instructions to the driver 14 of at least one of the plurality of electrode devices 6 to modify a position (and consequently, the workpiece-electrode gap 11) of the at least one of the plurality of electrodes 10 independently of at least one other one of the plurality of electrodes 10 based upon the detected position (and, e.g., workpiece-electrode gap 11) of the electrode 10. In various embodiments, control system 18 is coupled to sensor(s) 16, and is configured to obtain data about the position of electrodes 10 (as well as gap 11 between each electrode 10 and workpiece 8) from sensor(s) 16, and based upon that position data (and data about gap 11), instruct driver 14 of at least one of electrode devices 6 to modify a position of its corresponding electrode 10 (and therefore modify gap 11 between each electrode 10 and workpiece 8).

Control system 18 may be mechanically or electrically connected to electrode devices 6 (e.g., at driver 14) such that control system 18 may actuate at least one of electrode devices 6. Control system 18 may actuate driver 14 of electrode device(s) 6 in response to a detected position of electrode 10 (and gap 11 between each electrode 10 and workpiece 8), e.g., a discrepancy from a predicted electrode position (and gap 11 size), a discrepancy in position (and gap 11 size) with respect to the guide structure 4, etc. Control system 18 may be a computerized, mechanical, or electromechanical device capable of actuating electrode devices 6 (e.g., by initiating or halting driver 14). In one embodiment control system 18 may be a computerized device capable of providing operating instructions to electrode devices 6. In this case, control system 18 may monitor the position of one or more electrodes 10 as well as gap 11 between each electrode 10 and workpiece 8 (e.g., relative to a prescribed pattern and/or predetermined positional information and gap distance, via sensor(s) 16), comparing data about the topography of workpiece 8, along with desired hole locations, depths, etc. with data obtained from sensor(s) 16), and provide operating instructions to electrode device(s) 6 to independently modify a position (and consequently, gap 11) of at least one of the electrodes 10 in those device(s) 6. For example, control system 18 may send operating instructions to halt driver 14 of one electrode device 6 under certain operating conditions (e.g., where sensor(s) 16 detect that electrode 10 has reached its desired depth of penetration into workpiece 8). In this embodiment, electrode device 6 may include electro-mechanical components, capable of receiving operating instructions (electrical signals) from control system 18 and producing mechanical motion (e.g., pausing, initiating, etc. driver 14). In another embodiment, control system 18 may be an electro-mechanical device, capable of electrically monitoring (e.g., with sensors 16) parameters indicating positions (and in some cases, gaps 11) of one or more electrodes 10, and mechanically actuating the driver 14 of one or more corresponding electrode devices 6. While described in several embodiments herein, control system 18 may actuate electrode devices 6 through any other conventional means.

In various embodiments, each electrode 10 is controlled independently according to its position and gap 11 between the tip of electrode 10 and workpiece 8 (e.g., opening in workpiece 8 to be formed). As noted herein, electrode 10 can be driven (e.g., via driver 14) toward workpiece 8. Once electrode 10 starts to discharge on workpiece 8, electrode 10 federate can slow down and CS 18 takes over the feed control. If gap 11 becomes too small with a too low a voltage signal, the feed rate is slowed down (or even reversed) for electrode withdrawal to avoid shorting and overheating to workpiece 8. Once senor(s) 16 detect the end depth for the process (e.g., hole is formed to desired depth), the CS 18 stops feeding electrode 10 and withdraws electrode 10 independently while other electrodes 10 may still feed, or may be withdrawn, independently.

In various embodiments, guide structure 4 is coupled to electrode holder 12, where guide structure 4 includes a slide bearing 20 (FIG. 4, FIG. 5) allowing electrode holder 12 to move relative to guide structure 4. In some cases, as shown in FIGS. 1-3, EDM system 2 can further include a machine ram 22 coupled to guide structure 4, and a back plate 24 coupled to guide structure 4, where back plate 24 at least partially supports the driver 14 in each of the plurality of electrode devices 6.

Figure 2:
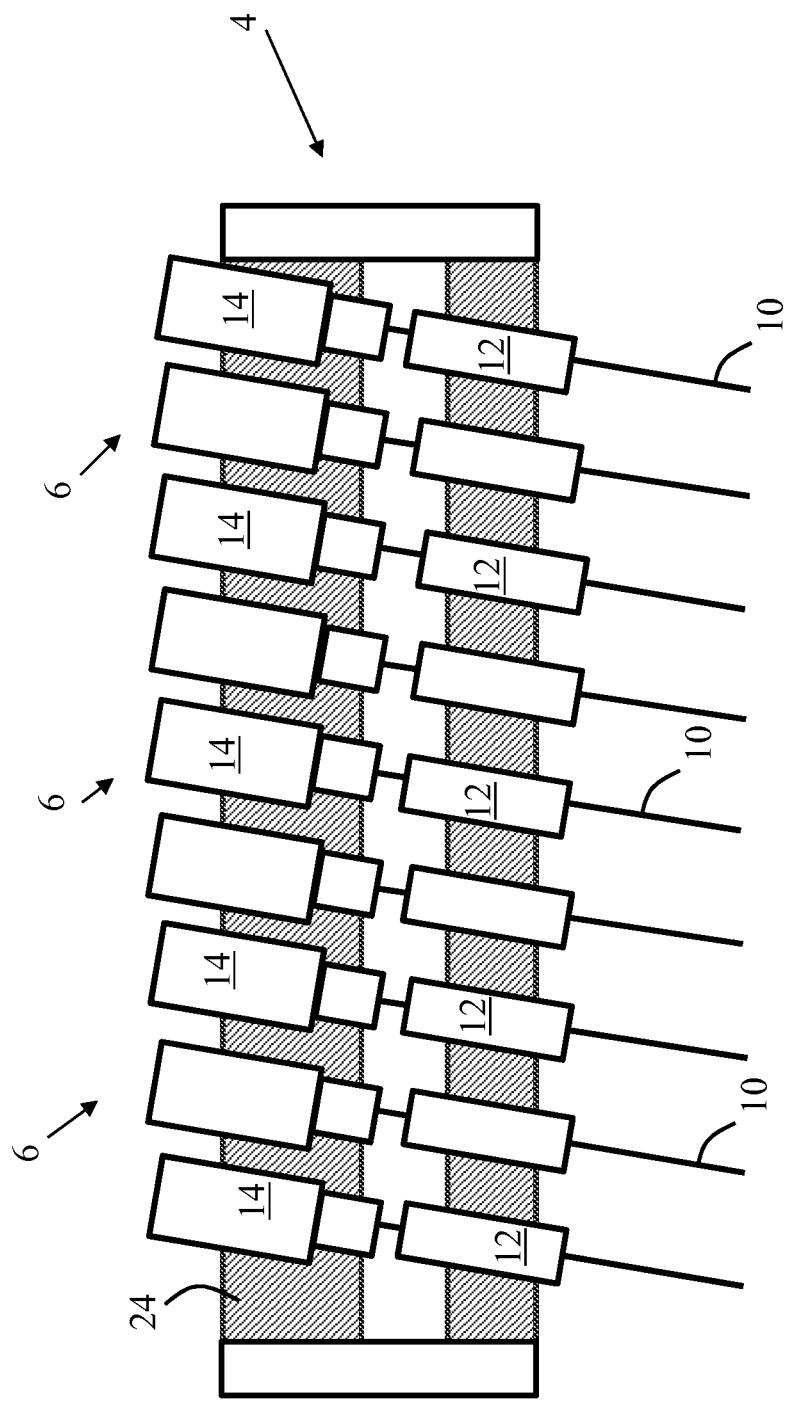
FIG. 2 shows a schematic partial cross-sectional view of an EDM system according to some embodiments.

As shown in FIG. 1 and FIG. 2, according to some embodiments, all of the plurality of electrode devices 6 can be aligned parallel with respect to one another and uniformly angled with respect to the guide structure 4. That is, all electrode devices 6 can be aligned in a parallel arrangement in order to form equally spaced openings in workpiece 8, at a same angle of contact.

Figure 3:
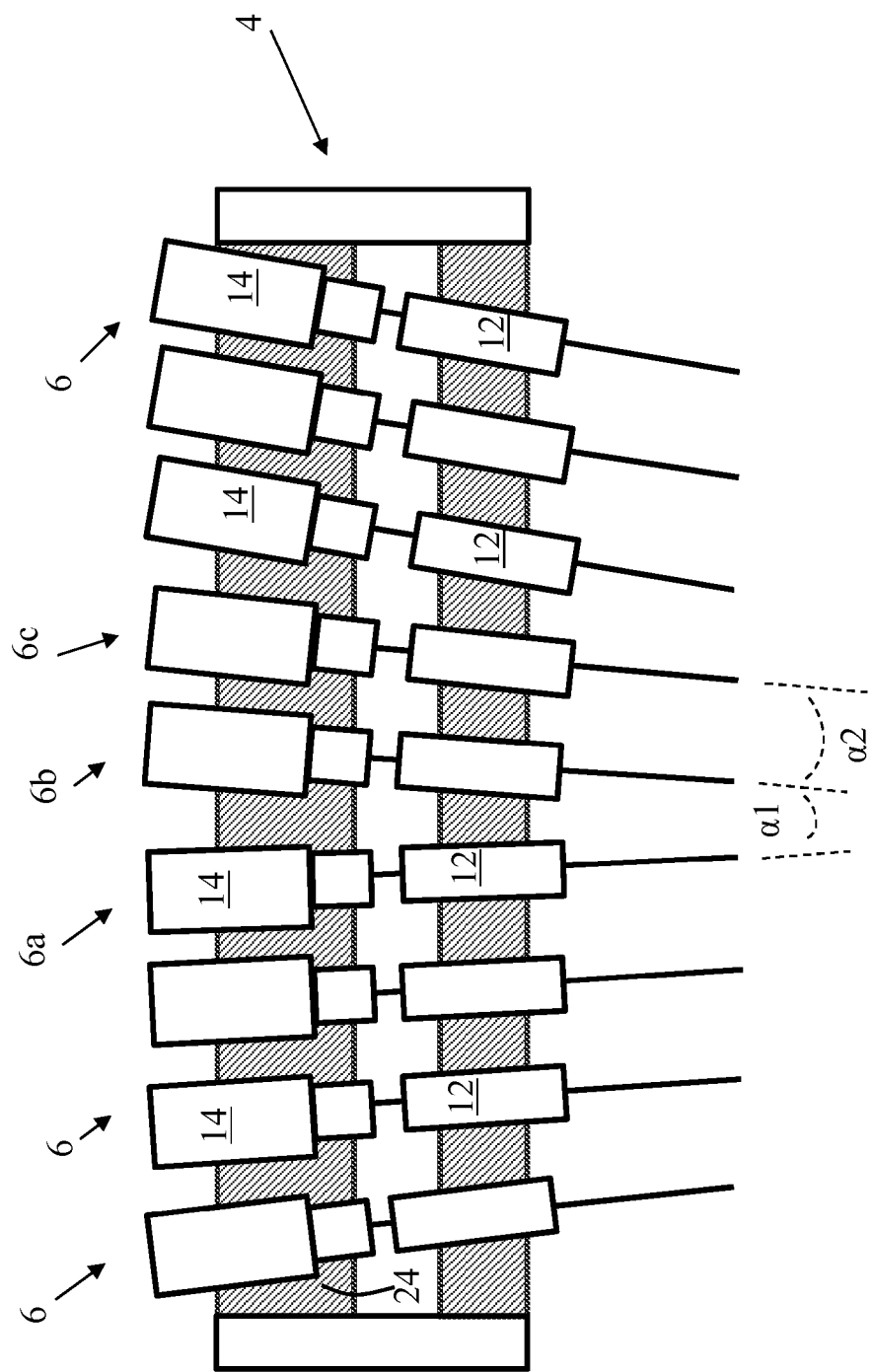
FIG. 3 shows a schematic partial cross-sectional view of an EDM system according to various additional embodiments.

FIG. 3 illustrates an alternative embodiment to the parallel arrangement in FIG. 2, where electrode devices 6 are aligned in a multi-directional alignment. In these cases, a first one (6a) of the plurality of electrode devices 6 is aligned at a first angle ($\alpha 1$) with respect to a second one (6b) of the plurality of electrode devices 6, and a third one (6c) of the plurality of electrode devices 6 is aligned at a second angle ($\alpha 2$) with respect to the second one 6b of the plurality of electrode devices 6, where the second angle ($\alpha 2$) is distinct from the first angle ($\alpha 1$).

As shown in FIG. 1, according to various embodiments, each of the plurality of electrode devices 6 (several shown) is connected with an independent power supply (IPS) 26, such that a loss of power to one of the plurality of electrode devices 6 does not cause a loss of power to the remainder of the electrode devices 6. In some embodiments, power supply 26 can be coupled to more than one electrode device 6, but it is understood that according to the embodiments disclosed herein, multiple power supplies 26 are employed, such that the entirety of electrode devices 6 is not reliant upon a single power source. It is understood that according to various embodiments, IPS 26 can prevent issues with a consolidated, central power supply, utilized in conventional systems. That is, a shared power supply provides one large spark to one of the multiple electrodes. At any given time in the electric discharging process, that one large spark is limited to only one electrode, so that metal removal rate is low when compared with a multi-spark configuration. The shared power supply (with one large spark) can yield poor surface quality because of the high power level at each electrode. According to various embodiments herein, the independent and dedicated power supplies can delivers precise amounts of power to one electrode at a desired time, based upon local gap control, as described herein. With a small gap and fast feeding, the independent power supply systems according to various embodiments can provide higher power locally when compared with conventional approaches. As each electrode-workpiece gap can differ (e.g., depending on local debris generation and dielectric flushing), independent and dedicated power supplies for distinct electrodes enables multiple sparks, for a high metal erosion rate, and a lower power level for high surface quality finishing after EDM is complete.

Figure 4:
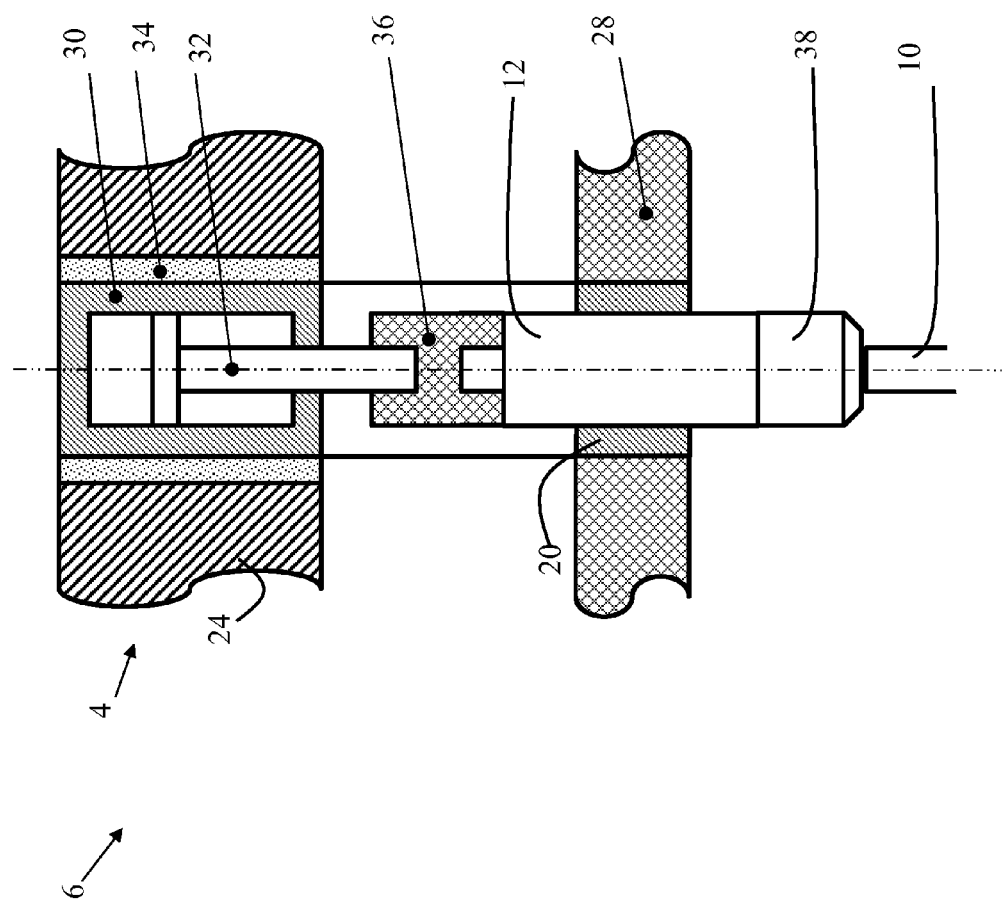
FIG. 4 shows a close-up partial cross-sectional view of a portion of an electrode device according to various embodiments.

FIG. 4 shows a close-up partial cross-sectional view of a portion of an electrode device 6 according to various embodiments. As shown In FIG. 4, in some embodiments, electrode device 6 is positioned within back plate 24 and slide bearing 20, where slide bearing 20 is housed within a guide plate 28. Driver 14 can include a hydraulic cylinder 30 and a piston 32 within that hydraulic cylinder 30 (FIG. 4). Both the cylinder 30 and piston 32 can be held within a bushing 34 at least partially retained by back plate 24. Driver 14 can be coupled to electrode holder 12 by an insulator connector 36. In some cases, electrode 10 is held by a clamp (e.g., collet clamp) 38 at the tip of electrode holder 12.

Figure 5:
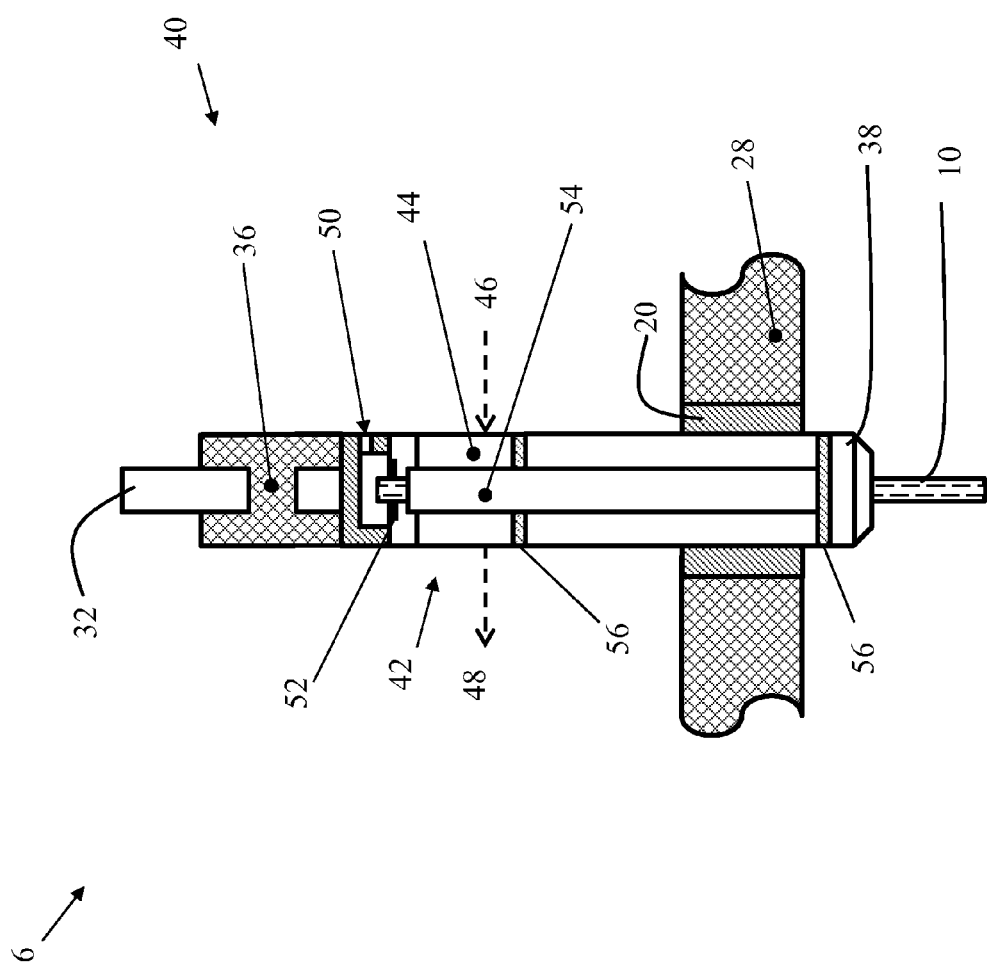
FIG. 5 shows an additional close-up partial cross-sectional view of a portion of an electrode device, including a rotating tube electrode device 40 according to various additional embodiments.

FIG. 5 shows an additional close-up partial cross-sectional view of a portion of an electrode device 6, where driver 14 includes a rotating tube electrode device 40, according to various additional embodiments of the disclosure. In these embodiments rotating tube electrode device 14 is coupled to a hydraulic piston 32 (connected with a cylinder 30) as shown and described with reference to FIG. 4. However, rotating tube electrode device 40 can further include a pneumatic rotary driver 42 including an air motor 44 (having compressed air inlet 46 and outlet 48), a water inlet 50 upstream of the air motor 44 (with adjacent seal 52), and a rotor 54 coupled with the air motor 44 (where rotor 54 is supported on bearings 56). Rotor 54 is connected with an electrode holder 12 (including electrode clamp 38). In this configuration, rotating tube electrode 40 is configured to rotate electrode 10 while hydraulic piston 32 drives electrode 10 toward workpiece 8. This rotating tube electrode device 40 shown in FIG. 5 can be useful in forming holes in workpiece 8 in spaces requiring minimal clearance and/or a high density of electrode devices 6.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical discharge machining (EDM) system comprising:
    a guide structure;
    a plurality of electrode devices positioned at least partially within the guide structure, the plurality of electrode devices aligned to provide a plurality of electrical discharges to a workpiece, each of the plurality of electrode devices including:
        an electrode for positioning proximate the workpiece;
        an electrode holder coupled to the electrode for holding the electrode proximate the workpiece; and
        a driver coupled to the electrode holder, the driver adapted to modify a position of the electrode holder and the electrode;
    a machine ram coupled to the guide structure and a back plate coupled to the guide structure, the back plate at least partially supporting the driver in each of the plurality of electrode devices; and
    a control system operably connected with the driver, the control system configured to provide instructions to the driver of at least one of the plurality of electrode devices to modify a position of the at least one of the plurality of electrodes independently of at least one other one of the plurality of electrodes.

2. The system of claim 1, wherein the guide structure is coupled to the electrode holder, the guide structure including a slide bearing allowing the electrode holder to move relative to the guide structure.

3. The system of claim 1, wherein the driver in each of the plurality of electrode devices includes at least one of a voice coil or a hydraulic driver.

4. The system of claim 1, wherein all of the plurality of electrode devices are aligned parallel with respect to one another and uniformly angled with respect to the guide structure.

5. The system of claim 1, wherein a first one of the plurality of electrode devices is aligned at a first angle with respect to a second one of the plurality of electrode devices, and wherein a third one of the plurality of electrode devices is aligned at a second angle with respect to the second one of the plurality of electrode devices, the second angle being distinct from the first angle.

6. The system of claim 1, wherein each of the plurality of electrode devices is connected with an independent power supply such that a loss of power to one of the plurality of electrode devices does not cause a loss of power to a remainder of the plurality of electrode devices.

7. An electrical discharge machining (EDM) system comprising:
    a guide structure;
    a plurality of electrode devices positioned at least partially within the guide structure, the plurality of electrode devices aligned to provide a plurality of electrical discharges to a workpiece, each of the plurality of electrode devices including:
        an electrode for positioning proximate the workpiece;
        an electrode holder coupled to the electrode for holding the electrode proximate the workpiece; and
        a driver coupled to the electrode holder, the driver adapted to modify a position of the electrode holder and the electrode;
    at least one sensor for detecting a position of an electrode relative to the workpiece in the plurality of electrode devices;
    a machine ram coupled to the guide structure and a back plate coupled to the guide structure, the back plate at least partially supporting the driver in each of the plurality of electrode devices; and
    a control system operably connected with the driver, the control system configured to provide instructions to the driver of at least one of the plurality of electrode devices to modify a position of the at least one of the plurality of electrodes independently of at least one other one of the plurality of electrodes based upon the detected position of the electrode.

8. The system of claim 7, wherein the guide structure is coupled to the electrode holder, the guide structure including a slide bearing allowing the electrode holder to move relative to the guide structure.

9. The system of claim 7, wherein the driver in each of the plurality of electrode devices includes at least one of a voice coil or a hydraulic driver.

10. The system of claim 7, wherein all of the plurality of electrode devices are aligned parallel with respect to one another and uniformly angled with respect to the guide structure.

11. The system of claim 7, wherein a first one of the plurality of electrode devices is aligned at a first angle with respect to a second one of the plurality of electrode devices, and wherein a third one of the plurality of electrode devices is aligned at a second angle with respect to the second one of the plurality of electrode devices, the second angle being distinct from the first angle.

12. The system of claim 7, wherein each of the plurality of electrode devices is connected with an independent power supply such that a loss of power to one of the plurality of electrode devices does not cause a loss of power to a remainder of the plurality of electrode devices.

13. An electrical discharge machining (EDM) system comprising:
    a guide structure;
    a machine ram coupled to the guide structure;
    a plurality of electrode devices positioned at least partially within the guide structure, the plurality of electrode devices aligned to provide a plurality of electrical discharges to a workpiece, each of the plurality of electrode devices including:
        an electrode for positioning proximate the workpiece;
        an electrode holder coupled to the electrode for holding the electrode proximate the workpiece; and
        a driver coupled to the electrode holder, the driver adapted to modify a position of the electrode holder and the electrode;

at least one sensor for detecting a position of an electrode relative to the workpiece in the plurality of electrode devices;

a back plate coupled to the guide structure, the back plate at least partially supporting the driver in each of the plurality of electrode devices;

a control system operably connected with the driver, the control system configured to provide instructions to the driver of at least one of the plurality of electrode devices to modify a position of the at least one of the plurality of electrodes independently of at least one other one of the plurality of electrodes based upon the detected position of the electrode; and a set of independent power supplies connected with each of the plurality of electrode devices such that a loss of power to one of the plurality of electrode devices does not cause a loss of power to a remainder of the plurality of electrode devices.

14. The system of claim 13, wherein the guide structure is coupled to the electrode holder, the guide structure including a slide bearing allowing the electrode holder to move relative to the guide structure.

15. The system of claim 13, wherein the driver in each of the plurality of electrode devices includes at least one of a voice coil or a hydraulic driver.

16. The system of claim 13, wherein all of the plurality of electrode devices are aligned parallel with respect to one another and uniformly angled with respect to the guide structure.

17. The system of claim 13, wherein a first one of the plurality of electrode devices is aligned at a first angle with respect to a second one of the plurality of electrode devices, and wherein a third one of the plurality of electrode devices is aligned at a second angle with respect to the second one of the plurality of electrode devices, the second angle being distinct from the first angle.

* * * * *